US012439278B2

(12) United States Patent
Xu

(10) Patent No.: US 12,439,278 B2
(45) Date of Patent: Oct. 7, 2025

(54) NETWORK SYSTEM LEVEL DIVISION METHOD AND APPARATUS

(71) Applicant: HUAWEI TECHNOLOGIES CO., LTD., Shenzhen (CN)

(72) Inventor: Ruiyue Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 17/541,842

(22) Filed: Dec. 3, 2021

(65) Prior Publication Data

US 2022/0095133 A1 Mar. 24, 2022

Related U.S. Application Data

(63) Continuation of application No. PCT/CN2020/094747, filed on Jun. 5, 2020.

(30) Foreign Application Priority Data

Jun. 6, 2019 (CN) .......................... 201910492320.6

(51) Int. Cl.
H04W 24/02 (2009.01)
H04L 41/0654 (2022.01)
(Continued)

(52) U.S. Cl.
CPC ......... H04W 24/02 (2013.01); H04L 41/0654 (2013.01); H04L 41/0886 (2013.01); H04L 41/5009 (2013.01); H04W 24/04 (2013.01)

(58) Field of Classification Search
CPC ...... G06Q 10/20; H04W 24/04; H04W 24/02; H04L 41/5009; H04L 41/0654; H04L 41/0886; Y04S 10/50
See application file for complete search history.

(56) References Cited

U.S. PATENT DOCUMENTS 6,012,152 A * 1/2000 Douik ................. G06F 11/0709
714/E11.027
11,388,615 B2 * 7/2022 Yanover ................ H04W 24/02
(Continued)

FOREIGN PATENT DOCUMENTS

CN 105512788 A 4/2016
CN 108880842 A 11/2018
(Continued)

OTHER PUBLICATIONS

"ENI Definition of Networked Intelligence Categorization", ETSI Draft Specification; ENI 007, European Telecommunications Standards Institute (ETSI), 650, Route Des Lucioles; F-06921 Sophia-Antipolis; France, vol. ISG ENI Experiential Networked Intelligence, No. V0.0.9 May 6, 2019, XP014340784 (Year: 2019).*

(Continued)

Primary Examiner — Mehmood B. Khan
(74) Attorney, Agent, or Firm — Maier & Maier, PLLC

(57) ABSTRACT

A network system level division method and an apparatus. The method may include: obtaining an operation and maintenance parameter of a network system in an operation and maintenance scenario, where the operation and maintenance parameter is used to represent operation and maintenance performance of the network system in the operation and maintenance scenario; and determining an automation level of the network system in the operation and maintenance scenario based on the operation and maintenance parameter of the network system in the operation and maintenance scenario, where the automation level of the network system in the operation and maintenance scenario is used to represent an automatic operation and maintenance degree of the network system in the operation and maintenance scenario. In this way, level division of automation degrees of the (Continued)

network system in a specific operation and maintenance scenario is implemented.

15 Claims, 3 Drawing Sheets

(51) Int. Cl.
*H04L 41/08* (2022.01)
*H04L 41/5009* (2022.01)
*H04W 24/04* (2009.01)

(56) References Cited

U.S. PATENT DOCUMENTS

| | | | |
|---|---|---|---|
| 2001/0022558 A1* | 9/2001 | Karr, Jr. | G01S 5/0278 |
| | | | 342/450 |
| 2010/0046379 A1* | 2/2010 | Goerge | H04L 41/044 |
| | | | 370/242 |
| 2011/0069625 A1* | 3/2011 | Michaelis | H04L 65/75 |
| | | | 370/252 |
| 2013/0144678 A1 | 6/2013 | Ramachandran | |
| 2014/0348068 A1* | 11/2014 | Morper | H04W 88/16 |
| | | | 370/328 |
| 2015/0188792 A1 | 7/2015 | Sanneck et al. | |
| 2016/0088502 A1* | 3/2016 | Sanneck | H04W 24/06 |
| | | | 370/242 |
| 2019/0049259 A1 | 2/2019 | Galan-Oliveras et al. | |
| 2019/0049958 A1 | 2/2019 | Liu et al. | |
| 2020/0313985 A1* | 10/2020 | Jayakumar | H04L 41/149 |
| 2021/0281468 A1* | 9/2021 | Al-Kanani | H04W 76/11 |
| 2022/0126878 A1* | 4/2022 | Moustafa | B60W 40/09 |

FOREIGN PATENT DOCUMENTS

| | | |
|---|---|---|
| CN | 108933810 A | 12/2018 |
| CN | 109377061 A | 2/2019 |
| CN | 109558464 A | 4/2019 |
| CN | 109656820 A | 4/2019 |
| WO | 2018137765 A1 | 8/2018 |

OTHER PUBLICATIONS

Chen Huiyan et al., "Theory and Design of Driverless Vehicles". Beijing Institute of Technology Press, Apr. 1, 2018, 5 pages.
Digital City Council of the Chinese Society for Urban Studies Rail Transit Group, Smart City and Rail Transit 2018. Central University for Nationalities Press, Jul. 2018, 4 pages.
Song Zhiqiang, "Application of Multiple Unmanned Platforms in Emergency Management". Suzhou University Press, Nov. 15, 2017, 3 pages.
Zhang Sihong et al., "Network Intelligence Based on Artificial Intelligence", ZTE Technology Journal; Mar. 26, 2019 ,total 8 pages.
3GPP, "Study on architecture enhancements for EPS and 5G System to support advanced V2X services (Release 16)", 3GPP TR 23.786 V2.0.0 (Mar. 2019); 119 Pages.
Du Yongsheng et al., "Network Intelligence: Artificial Intelligence Endows Network Automation", ZTE Technology Journal; Apr. 10, 2019, total 12 pages.
Huawei, "Add description for level of automation in mobile network management", 3GPP TSG-SA5 Meeting #125 S5-193173, Apr. 12, 2019; 2 pages.
Zhu, "Cloud Network Convergence Enables Network as a Service", ZTE Technology Journal, vol. 25, No. 2, Apr. 9, 2019, 6 pages (including English Abstract).
ETSI GR ENI 007 V0.0.9 (Apr. 2019)., "Experiential Networked Intelligence (ENI); ENI Definition of categories for AI application to Networks"; ETSI Draft Specification, 650, Route Des Lucioles ; XP014340784; F-06921 Sophia-Antipolis ; France vol. ISG , May 6, 2019; pp. 1-18.

* cited by examiner

NETWORK SYSTEM LEVEL DIVISION METHOD AND APPARATUS

CROSS-REFERENCE TO RELATED APPLICATIONS

This application is a continuation of International Application No. PCT/CN2020/094747, filed on Jun. 5, 2020, which claims priority to Chinese Patent Application No. 201910492320.6, filed on Jun. 6, 2019. The disclosures of the aforementioned applications are hereby incorporated by reference in their entireties.

TECHNICAL FIELD

The embodiments relate to the field of mobile communication technologies, and in particular, to a network system level division method and an apparatus.

BACKGROUND

In the field of wireless communication technologies, network system operation and maintenance means production organization management activities performed to ensure secure and effective running of network systems and related services, including network planning, network deployment, site deployment in the network systems, network optimization, network maintenance, service operation, and the like of the network systems. As 5G (5th generation) wireless communication technologies develop, a quantity of sites in a network system and complexity of connections between sites keep increasing, and network system operation and maintenance is increasingly difficult.

Currently, application of automation technologies in a mobile communication network, especially the application of the automation technologies in network system operation and maintenance, is gradually mature, and has become an effective way to reduce operation and maintenance costs and improve operation and maintenance efficiency in a situation in which current network system operation and maintenance is increasingly difficult.

Currently, although there are already discussions on automatic level division of a network system operation and maintenance process, network system level division methods are still lacking, and level division of automation degrees of network systems in a specific operation and maintenance scenario cannot be effectively performed. Consequently, it is difficult to quantitatively evaluate automatic operation and maintenance degrees of the network systems in the specific operation and maintenance scenario. This hinders improvement of automation degrees of network systems in an operation and maintenance process.

SUMMARY

The embodiments provide a network system level division method and an apparatus to implement level division of automation degrees of a network system in a specific operation and maintenance scenario.

According to a first aspect, the embodiments provide a network system level division method. The method may be implemented by a site, a component of the site, a subsystem, or a component of the subsystem in a to-be-evaluated network system, or may be implemented by a site, a system, a device, or a chip other than the to-be-evaluated network system. The method may include: obtaining an operation and maintenance parameter of a network system in an operation and maintenance scenario, where the operation and maintenance parameter is used to represent operation and maintenance performance of the network system in the operation and maintenance scenario; and determining an automation level of the network system in the operation and maintenance scenario based on the operation and maintenance parameter of the network system in the operation and maintenance scenario, where the automation level of the network system in the operation and maintenance scenario is used to represent an automatic operation and maintenance degree of the network system in the operation and maintenance scenario.

In the foregoing method, an operation and maintenance parameter of the network system in a specific operation and maintenance scenario may be obtained, and an automation level of the network system in the specific operation and maintenance scenario is determined based on the operation and maintenance parameter, to implement level division of automation degrees of the network system in the specific operation and maintenance scenario.

In a possible implementation, when the automation level of the network system in the operation and maintenance scenario is determined based on the operation and maintenance parameter of the network system in the operation and maintenance scenario, one of a plurality of reference automation levels may be determined as the automation level of the network system in the operation and maintenance scenario based on the operation and maintenance parameter of the network system in the operation and maintenance scenario and evaluation information of each of the plurality of reference automation levels in the operation and maintenance scenario. In this implementation, whether the automation level of the network system in the operation and maintenance scenario is the reference automation level may be determined based on the evaluation information of each of the plurality of reference automation levels in the operation and maintenance scenario. This improves efficiency of determining the automation level.

For example, the evaluation information of the reference automation level may be used to determine whether the automation level of the network system in the operation and maintenance scenario meets the reference automation level. For example, the evaluation information of the reference automation level may include characteristic information of the reference automation level, for example, some or all of information such as complexity information of a network system corresponding to the reference automation level, a quantity of sites (and/or subsystems) included in the network system, or network system establishment time. When the characteristic information of the reference automation level is met, it may be considered that the automation level of the network system in the operation and maintenance scenario meets the reference automation level. The foregoing evaluation information of the reference automation level may include level information corresponding to the reference automation level, for example, an operation and maintenance performance evaluation indicator corresponding to the reference automation level. The operation and maintenance performance indicator may be a threshold of an operation and maintenance parameter in an operation and maintenance scenario.

In a specific example, when the automation level of the network system in the operation and maintenance scenario is determined based on the operation and maintenance parameter of the network system in the operation and maintenance scenario, a reference automation level of the highest level may be selected from the plurality of reference automation levels as the automation level of the network system in the operation and maintenance scenario, where the operation and maintenance parameter of the network system in the operation and maintenance scenario meets evaluation information of the selected reference automation level of the highest level.

In another specific example, if the operation and maintenance parameter of the network system in the operation and maintenance scenario meets evaluation information of a first reference automation level, and the operation and maintenance parameter of the network system in the operation and maintenance scenario does not meet evaluation information of a second reference automation level, it may be determined that the automation level of the network system in the operation and maintenance scenario is the first reference automation level, where the second reference automation level and the first reference automation level are adjacent levels, and an automation degree represented by the second reference automation level is higher than an automation degree represented by the first reference automation level.

In another specific example, if the operation and maintenance parameter of the network system in the operation and maintenance scenario meets evaluation information of a third reference automation level, it may be determined that the automation level of the network system in the operation and maintenance scenario is the third reference automation level, where an automation degree represented by the third reference automation level is higher than automation degrees represented by all reference automation levels except the third reference automation level.

The foregoing operation and maintenance scenario includes at least one of a site deployment scenario, a network deployment scenario, a network optimization scenario, a network maintenance scenario, a network planning scenario, or a service operation scenario.

When the operation and maintenance scenario includes the site deployment scenario, the operation and maintenance parameter includes at least one of a site planning parameter, a full configuration data generation parameter, a site provisioning parameter, a site acceptance parameter, or the like.

In a specific example, the operation and maintenance parameter in this scenario may include at least one of the following parameters: a parameter used to indicate whether a person needs to participate in site planning, site planning duration, duration of human participation in site planning, a quantity of pieces of site planning data, site planning data accuracy, a parameter used to indicate whether a person needs to participate in full configuration data generation, full configuration data generation duration, a parameter used to indicate completeness of full configuration data, duration of human participation in full configuration data generation, a parameter used to indicate whether a person needs to participate in site provisioning, site provisioning duration, duration of human participation in site provisioning, a quantity of times a fault occurs in site provisioning, a parameter used to indicate whether a person needs to participate in site acceptance, site acceptance duration, duration of human participation in site acceptance, a site acceptance success rate, or site acceptance accuracy.

When the operation and maintenance scenario includes the network maintenance scenario, the operation and maintenance parameter may include at least one of a fault processing solution execution parameter, a data collection parameter (also referred to as a fault presentation parameter), a fault compression parameter, a fault root cause analysis parameter, a fault locating parameter, a fault prediction parameter, a fault processing solution decision-making parameter, or the like.

In a specific example, the operation and maintenance parameter in this scenario may include at least one of the following parameters: a parameter used to indicate whether a person needs to participate in fault processing solution execution, fault processing solution execution duration, duration of human participation in fault processing solution execution, a parameter used to indicate whether a person needs to participate in data collection, data collection duration, duration of human participation in data collection, a parameter used to indicate validity of collected data, a fault data compression rate, a parameter used to indicate whether a person needs to participate in root cause analysis, root cause analysis duration, duration of human participation in root cause analysis, a parameter used to indicate whether a person needs to participate in fault locating, fault locating accuracy, a parameter used to indicate whether fault prediction can be performed, a parameter used to indicate whether a person needs to participate in fault prediction, fault prediction accuracy, a fault prediction period, a parameter used to indicate whether a person needs to participate in fault processing solution decision-making, fault processing solution decision-making duration, duration of human participation in fault processing solution decision-making, fault processing solution decision-making accuracy, or a fault recovery success rate.

When the operation and maintenance scenario includes the network planning scenario, the foregoing operation and maintenance parameter may include at least one of the following parameters: a parameter used to indicate whether a person needs to participate in network planning, network planning duration, duration of human participation in network planning, network planning accuracy, a quantity of times a person participates in network planning, a parameter used to indicate whether manual site survey is required, or a parameter used to indicate whether manual site selection is required.

When the operation and maintenance scenario includes the network deployment scenario, the foregoing operation and maintenance parameter may include at least one of the following parameters: network deployment duration, duration of human participation in a network deployment process, a parameter of whether a person needs to participate in a process of mapping from a network requirement to a network topology, a parameter used to indicate whether a person needs to participate in a generation process from a network requirement to a network configuration, or a quantity of interruptions in a network deployment process.

When the operation and maintenance scenario includes the network optimization scenario, the operation and maintenance parameter may include at least one of a network performance data collection parameter (also referred to as a performance presentation parameter), an optimization parameter configuration parameter, a problem identification parameter, an optimization solution formulation and decision-making parameter, an intent requirement decomposition parameter, or the like.

In a specific example, the operation and maintenance parameter in this scenario may include at least one of the following parameters: a parameter used to indicate whether a person needs to participate in data collection, a parameter used to indicate whether a person needs to input a collection policy, data collection duration, duration of human participation in data collection, a parameter used to indicate whether network performance data can be collected, a parameter used to indicate whether drive test data can be collected, a parameter used to indicate whether QoE data can be collected, a parameter used to indicate whether a person needs to participate in optimization parameter configuration, optimization parameter configuration duration, duration of human participation in optimization parameter configuration, optimization evaluation accuracy, a parameter used to indicate whether a person needs to participate in network problem identification, network problem identification duration, duration of human participation in network problem identification, network problem identification accuracy, a parameter used to indicate whether a person needs to participate in optimization solution formulation, optimization solution formulation duration, duration of human participation in optimization solution formulation, a parameter used to indicate whether a person needs to participate in optimization solution decision-making, optimization solution decision-making duration, duration of human participation in optimization solution decision-making, optimization solution decision-making accuracy, a parameter used to indicate whether a person needs to participate in dynamic optimization policy update, dynamic optimization policy update duration, duration of human participation in dynamic optimization policy update, dynamic optimization policy update accuracy, or a parameter used to indicate whether network optimization can be implemented based on an optimization intent.

When the operation and maintenance scenario includes the service operation scenario, the operation and maintenance parameter may include at least one of a service requirement mapping parameter, a service provisioning parameter, a service evaluation parameter, a service performance presentation parameter, or the like.

In a specific example, the operation and maintenance parameter in this scenario may include at least one of the following parameters: a parameter used to indicate whether a person needs to participate in a process of mapping from a service requirement to a network requirement, duration of mapping from a service requirement to a network requirement, duration of human participation in mapping from a service requirement to a network requirement, a parameter used to indicate whether a person needs to participate in a service provisioning process, duration of a service provisioning process, duration of human participation in a service provisioning process, service provisioning accuracy, a parameter used to indicate whether a person needs to participate in service evaluation, service evaluation duration, a parameter used to indicate whether a person needs to participate in service performance presentation, service performance presentation duration, or a parameter used to indicate whether service performance can be presented.

In a possible implementation, the method may further include: determining a plurality of operation and maintenance scenarios supported by the network system; and determining the automation level of the network system based on automation levels of the network system in the plurality of supported operation and maintenance scenarios. In this implementation, the automation level of the network system may be determined based on the automation levels of the network system in the plurality of operation and maintenance scenarios. This implements comprehensive evaluation of the automation level of the network system, and improves accuracy of evaluation of the automation level of the network system. The plurality of operation and maintenance scenarios supported by the network system may include the operation and maintenance scenario.

According to a second aspect, the embodiments provide an apparatus. The apparatus may be configured to perform the method according to any one of the first aspect and the possible implementations of the first aspect. The apparatus may implement functions in the foregoing methods in a form of a hardware structure, a software module, or a combination of the hardware structure and the software module. For example, when the apparatus includes a software module, the apparatus may include a parameter obtaining module and a level determining module that are coupled to each other, and the parameter obtaining module and the level determining module implement any possible implementation method according to the first aspect.

When performing the method according to the first aspect, the operation and maintenance parameter obtaining module may be configured to obtain an operation and maintenance parameter of a network system in an operation and maintenance scenario, where the operation and maintenance parameter is used to represent operation and maintenance performance of the network system in the operation and maintenance scenario; and the level determining module may be configured to determine an automation level of the network system in the operation and maintenance scenario based on the operation and maintenance parameter of the network system in the operation and maintenance scenario, where the automation level of the network system in the operation and maintenance scenario is used to represent an automatic operation and maintenance degree of the network system in the operation and maintenance scenario.

In a possible implementation, the level determining module may be configured to determine, based on the operation and maintenance parameter of the network system in the operation and maintenance scenario and evaluation information of each of a plurality of reference automation levels in the operation and maintenance scenario, one of the plurality of reference automation levels as the automation level of the network system in the operation and maintenance scenario.

For example, the evaluation information of the reference automation level may be used to determine whether the automation level of the network system in the operation and maintenance scenario meets the reference automation level.

The foregoing evaluation information of the reference automation level may include level information corresponding to the reference automation level, for example, an operation and maintenance performance evaluation indicator corresponding to the reference automation level. The operation and maintenance performance indicator may be a threshold of an operation and maintenance parameter in an operation and maintenance scenario.

In a possible implementation, the level determining module may be configured to select a reference automation level of the highest level from the plurality of reference automation levels as the automation level of the network system in the operation and maintenance scenario, where the operation and maintenance parameter of the network system in the operation and maintenance scenario meets evaluation information of the selected reference automation level of the highest level.

In a specific example, if the operation and maintenance parameter of the network system in the operation and maintenance scenario meets evaluation information of a first reference automation level, and the operation and maintenance parameter of the network system in the operation and maintenance scenario does not meet evaluation information of a second reference automation level, the level determining module may be configured to determine that the automation level of the network system in the operation and maintenance scenario is the first reference automation level, where the second reference automation level and the first reference automation level are adjacent levels, and an automation degree represented by the second reference automation level is higher than an automation degree represented by the first reference automation level.

In another example, if the operation and maintenance parameter of the network system in the operation and maintenance scenario meets evaluation information of a third reference automation level, the level determining module may be configured to determine that the automation level of the network system in the operation and maintenance scenario is the third reference automation level, where an automation degree represented by the third reference automation level is higher than automation degrees represented by all reference automation levels except the third reference automation level.

For the operation and maintenance scenario and the operation and maintenance parameter, refer to descriptions according to any one of the first aspect and the possible implementations of the first aspect.

In a possible implementation, the level determining module may be further configured to: determine a plurality of operation and maintenance scenarios supported by the network system; and determine the automation level of the network system based on automation levels of the network system in the plurality of supported operation and maintenance scenarios.

For the plurality of operation and maintenance scenarios supported by the network system, refer to descriptions of the operation and maintenance scenario according to any one of the first aspect and the possible implementations of the first aspect. For a manner of determining the automation levels of the network system in the plurality of operation and maintenance scenarios supported by the network system, refer to the manner of determining the automation level of the network system in the operation and maintenance scenario according to the first aspect and the possible implementations of the first aspect.

When the foregoing apparatus is implemented by using a hardware component, the apparatus may include a processor. The processor may perform the steps performed by the operation and maintenance parameter obtaining module and/or the level determining module. When the foregoing apparatus is implemented by using a hardware component, the apparatus may further include a memory and/or a transceiver. The memory is configured to store a program, and the processor may execute the program to perform steps performed by the processing module. The transceiver may be configured to support the foregoing apparatus in communicating with another device or apparatus.

According to a third aspect, the embodiments provide a network system. The network system may include the apparatus according to the second aspect.

According to a fourth aspect, the embodiments provide a computer storage medium. The computer storage medium stores instructions (also referred to as a program). When the instructions are invoked and executed on a computer, the computer is enabled to perform the method according to any one of the first aspect or the possible implementations of the first aspect.

According to a fifth aspect, the embodiments provide a computer program product. The computer program product may include instructions. When the computer program product runs on a computer, the computer is enabled to perform the method according to any one of the first aspect or the possible implementations of the first aspect.

According to a sixth aspect, the embodiments provide a chip or a chip system including the chip. The chip may include a processor. The chip may further include a memory (or a storage module) and/or a transceiver (or a communication module). The chip may be configured to perform the method according to any one of the first aspect or the possible implementations of the first aspect. The chip system may include the chip, or may include the chip and another discrete component, such as a memory (or a storage module) and/or a transceiver (or a communication module).

For beneficial effects of the second aspect to the sixth aspect and the possible implementations of the second aspect to the sixth aspect, refer to descriptions of the beneficial effects of the method according to any one of the first aspect and the possible implementations of the first aspect.

DETAILED DESCRIPTION OF THE EMBODIMENTS

To make objectives, solutions, and advantages of the embodiments clearer, the following further describes the embodiments in detail with reference to accompanying drawings. A specific operation method in a method embodiment may also be applied to an apparatus embodiment or a system embodiment.

For ease of understanding the solutions in embodiments, a scenario to which the embodiments may be applied is first described.

Figure 1:
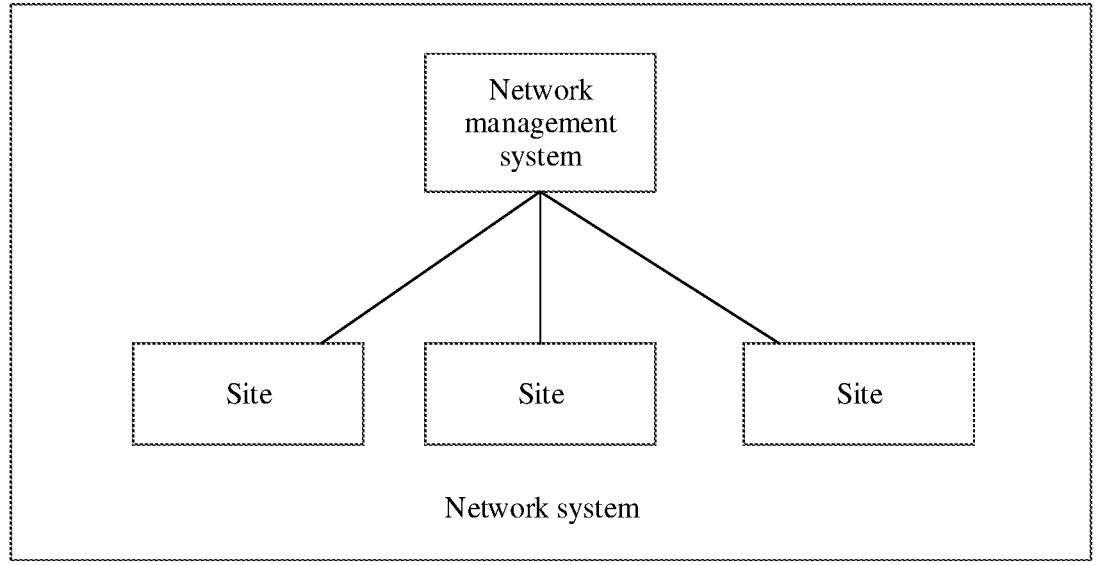
FIG. 1 is a schematic diagram of an architecture of a network system to which an embodiment is applicable.

As shown in FIG. 1, a network system (also referred to as a telecommunication network system, a communication network system, or the like) described in the embodiments is a communication system including at least one network site (also referred to as a site or a network element). When the network system includes a plurality of sites, the plurality of sites in the network system may communicate with each other in a wired and/or wireless manner. The network system may include at least one subsystem, and each subsystem may include at least one site. The network system may further include a network management system, used to provide a network operation and maintenance function, for example, may be used for network life cycle management, network deployment, network fault management, network performance management, network configuration management, network assurance, network data analysis, and network data collection. The network management system may include one or more sites in the network system. The network management system may be a subsystem of the network system.

The network management system includes, but is not limited to, a network slice manager (NSMF), a subnetwork manager (or subnetwork management function), a domain manager (DM), a network function virtualization orchestrator (NFVO), a virtualized network function manager (VNFM), or the like. The network slice manager is configured to provide an operation and maintenance function of a network slice. The subnetwork manager is configured to provide an operation and maintenance function of a subnetwork. The domain manager is configured to provide an operation and maintenance function of a network and a network device in a domain. The network function virtualization orchestrator is configured to provide an operation and maintenance function of a network service and a virtualized network function (VNF). The virtualized network function manager is configured to provide an operation and maintenance function of a virtualized network function.

It should be understood that the site in the embodiments may include an access network site and a core network site in a wireless communication system. The access network site may include a base station (BS), or include a base station, a radio resource management device configured to control the base station, and the like. The base station may be a radio access network (RAN) base station or an access network (AN) base station. This is not limited in the embodiments. The access network station may include a relay station (or relay device), an access point, a vehicle-mounted device, a wearable device and a base station in a future 5G network, a base station in a future evolved public land mobile network (PLMN), an NR base station, or the like. This is not limited in the embodiments. Alternatively, the site may be a communication chip having a communication module. The core network site may include a network element in a core network of the wireless communication system, for example, a device such as a mobility management entity (MME) and a mobile switching center (MSC).

Figure 2:
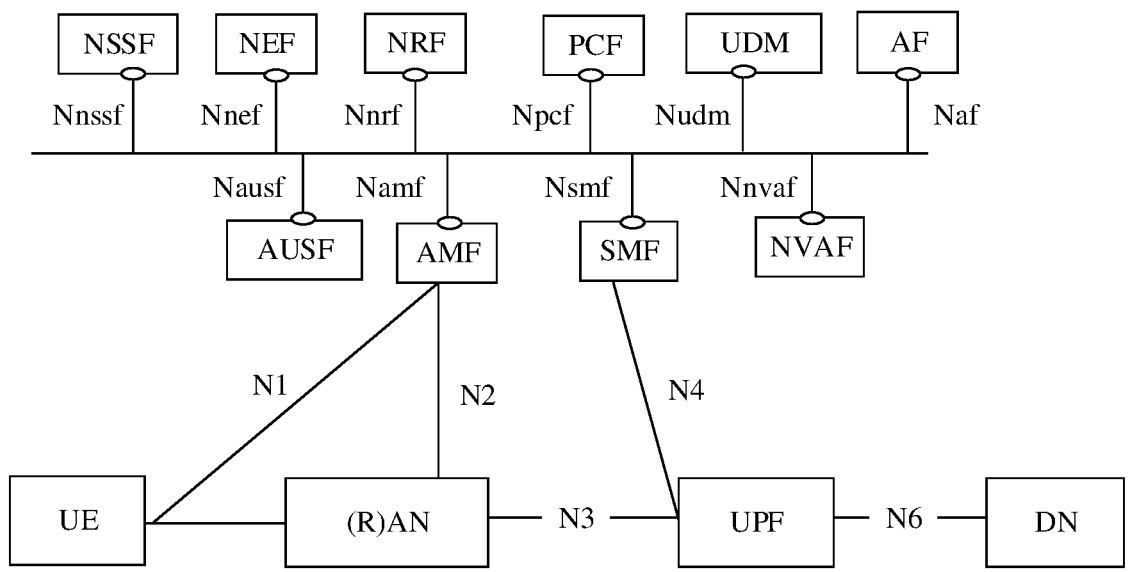
FIG. 2 is a schematic diagram of an architecture of another network system to which an embodiment is applicable.

For example, in a 5G communication system shown in FIG. 2, a 5G network architecture may include three parts: a terminal device part, a data network (DN) part, and a carrier network part. The network system shown in the embodiments may include one or more sites of the carrier network part.

The sites in the carrier network may include, but are not limited to, a network slice selection (NSSF) network element, a network exposure function (NEF) network element, a network repository function (NRF) network element, a policy control function (PCF) network element, a unified data management (UDM) network element, an application function (AF) network element, a network vision and awareness function (NVAF) network element, an authentication server function (AUSF) network element, an access and mobility management function (AMF) network element, a session management function (SMF) network element, a (radio) access network ((R)AN), a user plane function (UPF) network element, and the like. In the foregoing carrier network, the parts other than the (radio) access network may be referred to as core network (CN) parts. For ease of description, the following uses an example in which the (R)AN is referred to as an access network device for description.

UE shown in FIG. 2 may be a device having a wireless transceiver function. The UE may be deployed on land, including an indoor device, an outdoor device, a handheld device, or a vehicle-mounted device, may be deployed on a water surface (for example, on a ship), or may be deployed in air (for example, in an aircraft, a balloon, and a satellite). The UE may be a mobile phone, a tablet (or pad), a computer having a wireless transceiver function, a virtual reality (VR) terminal, an augmented reality (AR) terminal, a wireless terminal in industrial control, a mobile robot in a 5G vertical industry, an automated guided vehicle (AGV), a wireless terminal such as a sensor, a control device, or a device on a vehicle and a train, a wireless terminal in a self driving vehicle or device , a wireless terminal in telemedicine, a wireless terminal in a smart grid, a wireless terminal in transportation safety, a wireless terminal in a smart city, a wireless terminal in a smart home, or the like.

The terminal device may establish a connection to the carrier network through an interface (for example, N1) provided by the carrier network, and use a service such as data and/or a voice provided by the carrier network. The terminal device may further access the DN through the carrier network, and use a carrier service deployed on the DN and/or a service provided by a third party. The third party may be a service provider other than the carrier network and the terminal device, and may provide a service such as data and/or a voice to the terminal device. A specific representation form of the third party may be determined based on an actual application scenario and is not limited herein.

The access network device is a device that provides a wireless communication function to a terminal. The access network device includes, but is not limited to: a next generation base station (gNB) in 5G, an evolved NodeB (eNB), a radio network controller (radio network controller, RNC), a NodeB (NB), a base station controller (BSC), a base transceiver station (BTS), a home base station (for example, a home evolved NodeB, or a home NodeB, (HNB)), a baseband unit (BBU), a transmitting and receiving point (TRP), a transmitting point (TP), a mobile switching center, and the like.

The foregoing network slice selection (NSSF) network element may be configured to implement flexible selection of a network slice. For example, the network slice selection network element may support a slice selection policy based on a plurality of types of information such as network slice selection assistance information (NSSAI), location information, or slice load information, and an intelligent slice selection solution based on the slice selection policy. The network slice selection network element may store information such as a slice selection policy configured by a carrier. In 5G, the network slice selection network element may be an NSSF network element. In future communication, for example, in 6G (6th generation), the network slice selection network element may still be an NSSF network element, or may have another name This is not limited in the embodiments.

The foregoing access and mobility management function (AMF) network element is a control plane network element provided by the carrier network, and is responsible for access control and mobility management when the terminal device accesses the carrier network, for example, including functions such as mobility status management, temporary user identity assignment, and user authentication and authorization. In 5G, the access and mobility management function network element may be an AMF network element. In future communication, for example, in 6G, the access and mobility management function network element may still be an AMF network element or may have another name. This is not limited in the embodiments.

The foregoing session management (SMF) network element is a control plane network element provided by the carrier network, and is responsible for managing a protocol data unit (PDU) session of the terminal device. The PDU session is a channel used to transmit a PDU, and the terminal device needs to transmit a PDU to the DN through the PDU session. The SMF network element is responsible for establishment, maintenance, deletion, and the like of the PDU session. The SMF network element includes session-related functions such as session management (for example, session establishment, modification, and release, including maintenance of a tunnel between the UPF and the RAN), selection and control of the UPF network element, service and session continuity (SSC) mode selection, and roaming. In 5G, the session management network element may be the SMF network element. In future communication, for example, in 6G, the session management network element may still be an SMF network element, or may have another name. This is not limited in the embodiments.

The foregoing network vision and awareness function NVAF network element may store environment information corresponding to a vertical industry (for example, map data of the vertical industry and layout information of a factory area that can be obtained from a vertical industry control center), and communication network deployment information (for example, a deployment area of an access network device and coverage of a network cell) of an area corresponding to the vertical industry, and may further obtain information such as a movement path of the terminal device from the vertical industry control center. In 5G, the network vision and awareness function network element may be an NVAF network element. In future communication, for example, in 6G, the network vision and awareness function network element may still be an NVAF network element, or may have another name. This is not limited in the embodiments.

The foregoing user plane function (UPF) network element is a gateway provided by the carrier, and is a gateway for communication between the carrier network and the DN. The UPF network element includes user plane-related functions such as packet routing and transmission, packet detection, service usage reporting, quality of service (QoS) processing, lawful interception, uplink packet detection, and downlink packet storage. In 5G, the user plane function network element may be a UPF network element. In future communication, for example, in 6G, the user plane function network element may still be a UPF network element, or may have another name This is not limited in the embodiments.

The DN may also be referred to as a packet data network (PDN), and is a network located outside the carrier network. The carrier network may access a plurality of DNs, and a plurality of services may be deployed on the DNs, to provide a service such as data and/or a voice to the terminal device. For example, the DN is a private network of a smart factory, a sensor installed in a workshop of the smart factory may be a terminal device, a control server of the sensor is deployed in the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The foregoing unified data management UDM network element is a control plane network element provided by the carrier, and is responsible for storing information such as a subscriber permanent identifier (SUPI), a credential, a security context, and subscription data of a subscriber in the carrier network. The information stored in the UDM network element may be used for authentication and authorization when the terminal device accesses the carrier network. The subscriber in the carrier network may be a subscriber using a service provided by the carrier network, for example, a subscriber using a subscriber identification module card of China Telecom, or a subscriber using a subscriber identification module card of China Mobile. The SUPI of the subscriber may be a number of the subscriber identification module card, and the like. The credential and the security context of the subscriber may be stored small files such as an encryption key of the subscriber identification module card or information related to encryption of the subscriber identification module card, and are used for authentication and/or authorization. The security context may be cookie, a token, or the like stored in a local terminal (for example, a mobile phone) of the subscriber. The subscription data of the subscriber may be a supporting service of the subscriber identification module card, for example, a data package or available data of the subscriber identification module card. It should be noted that the permanent identifier, the credential, the security context, the cookie, and the token are equivalent to information related to authentication and authorization, and are not limited or distinguished between each other for ease of description in the embodiments. Unless otherwise specified, the security context is used as an example for description in this embodiment. However, this embodiment is also applicable to authentication and/or authorization information described in another expression manner. In 5G, the unified data management network element may be a UDM network element. In future communication, for example, in 6G, the unified data management network element may still be a UDM network element, or may have another name. This is not limited in the embodiments.

The foregoing network exposure function (NEF) network element is a control plane network element provided by the carrier. The network exposure function network element securely exposes an external interface of the carrier network to a third party. When the SMF network element needs to communicate with a third-party network element, the network exposure function network element may serve as a relay for communication between the SMF network element and the third-party network element. When the network exposure function network element serves as the relay, the network exposure function network element may translate identification information of the subscriber and identification information of the third-party network element. For example, when the NEF sends the SUPI of the subscriber from the carrier network to the third party, the NEF may translate the SUPI into an external identity (ID) of the subscriber. On the contrary, when the network exposure function network element sends an external ID (an ID of the third-party network element) to the carrier network, the network exposure function network element may translate the external ID into the SUPI. In 5G, the network exposure function network element may be an NEF network element. In future communication, for example, in 6G, the network exposure function network element may still be an NEF network element, or may have another name. This is not limited in the embodiments.

The foregoing policy control function PCF network element is a control plane function provided by the carrier, and is configured to provide a PDU session policy for the SMF network element. The policy may include a charging-related policy, a QoS-related policy, an authorization-related policy, and the like. In 5G, the policy control function network element may be a PCF network element. In future communication network, for example, in 6G, the policy control function network element may still be a PCF network element, or may have another name. This is not limited in the embodiments.

In FIG. 2, Nnssf, Nnef, Nausf, Nnrf, Npcf, Nudm, Naf, Namf, Nnvaf, Nsmf, N1, N2, N3, and N4, and N6 are interface sequence numbers. For meanings of these interface sequence numbers, refer to meanings defined in the 3GPP standard protocol. This is not limited herein.

In the embodiments, "at least one" mentioned below means one or more, that is, one, two, three, or more. "A plurality of" means two or more, that is, two, three, or more. "Carrying" may mean that a message is used to carry information or data, or may mean that a message includes information. A coupling is an indirect coupling or a communication connection between apparatuses, units, or modules, and may be in an electrical form, a mechanical form, or in another form, and is used for information exchange between the apparatuses, the units, and the modules.

In addition, it should be understood that in the embodiments, the term "and/or" describes an association relationship for describing associated objects and represents that three relationships may exist. For example, A and/or B may represent the following cases: only A exists, both A and B exist, and only B exists, where A and B may be in a singular or plural form. The character "/" generally indicates an "or" relationship between the associated objects. "At least one of the following pieces (items)" or a similar expression thereof means any combination of these items, including any combination of singular items (pieces) or plural items (pieces). For example, at least one of a, b, or c may represent a, b, c, a and b, a and c, b and c, or a, b, and c, where a, b, and c may be singular or plural.

The following describes in detail the management method embodiments with reference to the wireless communication systems shown in FIG. 1 and FIG. 2. First, a network system level division method provided in the embodiments is described, and then an apparatus provided in the embodiments is described.

To resolve the problem mentioned in the background, the embodiments provide a network system level division method based on the architecture shown in FIG. 1.

For example, the network system level division method described below in the embodiments may be performed by an automatic level division apparatus. For example, the automatic level division apparatus may be configured to perform steps shown in S101 and/or S102. The automatic level division apparatus may be a site or a subsystem in a to-be-evaluated network system, a functional module in a site, or a functional module in a subsystem. Alternatively, the automatic level division apparatus may be a site or a system other than that in the to-be-evaluated network system, a functional module or chip in a site, or a functional module in a system. For example, the automatic level division apparatus may be a network management system in the to-be-evaluated network system.

Figure 3:
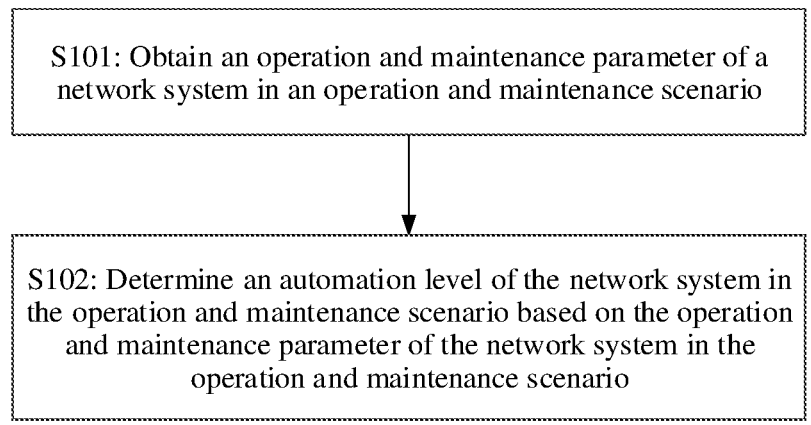
FIG. 3 is a schematic flowchart of a network system level division method according to an embodiment.

As shown in FIG. 3, the method may include the following steps S101 and S102.

S101: Obtain an operation and maintenance parameter of a network system in an operation and maintenance scenario, where the operation and maintenance parameter is used to represent operation and maintenance performance of the network system in the operation and maintenance scenario.

In the embodiments, the operation and maintenance scenario may correspond to one or more operation and maintenance processes of the network system, and the network system performs corresponding operation and maintenance in each operation and maintenance process. For example, an operation and maintenance process of the network system may include aspects such as network planning, network deployment, site deployment in the network system, network optimization, network maintenance, and service operation. Correspondingly, the operation and maintenance scenario of the network system may include one or more of a network planning scenario, a network deployment scenario, a site deployment scenario, a network optimization scenario, a network maintenance scenario, a service operation scenario, or another operation and maintenance scenario.

In the network planning scenario, the network system performs network planning and design, including planning and design of a network air interface, a spectrum, an architecture, and/or performance, to meet a new scenario or a new service. The operation and maintenance parameter in this scenario may include at least one of the following parameters: a parameter used to indicate whether a person needs to participate in network planning, network planning duration, duration of human participation in network planning, network planning accuracy, a quantity of times a person participates in network planning, a parameter used to indicate whether manual site survey is required, or a parameter used to indicate whether manual site selection is required, where site survey refers to collecting and obtaining information about a site, for example, a terrain, an obstacle, and/or a nearby site.

In the network deployment scenario, the network system executes a network deployment process, including deploying a site, generating a network topology, and/or configuring a site based on a network planning situation, to meet a service requirement. The operation and maintenance parameter in this scenario may include at least one of the following parameters: network deployment duration, duration of human participation in a network deployment process, a parameter of whether a person needs to participate in a process of mapping from a network requirement to a network topology, a parameter used to indicate whether a person needs to participate in a generation process from a network requirement to a network configuration, or a quantity of interruptions in a network deployment process.

In the site deployment scenario, the network system executes a site deployment process, including site planning, site provisioning, full site configuration data generation, and/or site acceptance. The operation and maintenance parameter in this scenario may include at least one of a site planning parameter, a full configuration data generation parameter, a site provisioning parameter, a site acceptance parameter, or the like.

The site planning parameter may be a parameter related to a key planning process and may specifically include at least one of a parameter used to indicate whether a person needs to participate in site planning, site planning duration, duration of human participation in site planning, a quantity of pieces of site planning data, site planning data accuracy, or the like. The site planning data accuracy may be used to indicate accuracy of output data in site planning.

The full configuration data generation parameter may be a parameter related to a full configuration data generation process and may include at least one of a parameter used to indicate whether a person needs to participate in full configuration data generation, full configuration data generation duration, a parameter used to indicate completeness of full configuration data, duration of human participation in full configuration data generation, or the like. The full configuration data refers to all configuration parameters and/or data required by a site and/or a subsystem in the network system.

The parameter used to indicate completeness of full configuration data may be used to indicate completeness of the full configuration data. In other words, lower completeness indicates a higher proportion of full configuration data that needs to be subsequently improved in a manner such as manual input to all the full configuration data.

The site provisioning parameter may be a parameter related to a site provisioning process and may include at least one of a parameter used to indicate whether a person needs to participate in site provisioning, site provisioning duration, duration of human participation duration in site provisioning, a quantity of times a fault occurs in site provisioning, or the like. The site provisioning refers to a process from site power-on to successful site self-configuration.

The site acceptance parameter may be a parameter related to a site acceptance process and may include at least one of a parameter used to indicate whether a person needs to participate in site acceptance, site acceptance duration, duration of human participation in site acceptance, a site acceptance success rate, site acceptance accuracy, or the like. The site acceptance refers to testing whether site provisioning meets expectations. If the site provisioning meets the expectations, it is determined that the acceptance is successful.

In the network optimization scenario, the network system performs network optimization, including service assurance requirement breakdown, optimization policy generation, data collection, problem discovery, problem identification, optimization solution generation and decision-making, optimization solution execution, and/or the like, to meet a service assurance requirement. The operation and maintenance parameter in this scenario may include at least one of a network performance data collection parameter (also referred to as a performance presentation parameter), an optimization parameter configuration parameter, a problem identification parameter, an optimization solution formulation and decision-making parameter, an intent requirement decomposition parameter, or the like.

The network performance data collection parameter may be a parameter related to a network performance data collection process and may include at least one of a parameter used to indicate whether a person needs to participate in network performance data collection, a parameter used to indicate whether a person needs to input a network performance data collection policy, network performance data collection duration, duration of human participation in network performance data collection, a parameter used to indicate whether network performance data can be collected, a parameter used to indicate whether drive test data can be collected, a parameter used to indicate whether quality of experience (QoE) data can be collected, or the like. The network performance data may include data such as a capacity, physical resource block (PRB) usage, a service drop rate, and/or a delay. The drive test data may include a measurement report, with longitude and latitude information, that is reported by UE, for example, data about minimization of drive tests (MDT). QoE refers to a user's subjective experience on a network system or on quality and performance of a network-carried service provided by the network system, for example, voice QoE and/or video QoE.

The optimization parameter configuration parameter may be a parameter related to an optimization parameter configuration process and may include at least one of a parameter used to indicate whether a person needs to participate in optimization parameter configuration, optimization parameter configuration duration, duration of human participation in optimization parameter configuration, optimization evaluation accuracy, or the like.

The problem identification parameter may be a parameter related to a network problem identification process and may include at least one of a parameter used to indicate whether a person needs to participate in network problem identification, network problem identification duration, duration of human participation in network problem identification, network problem identification accuracy, or the like.

The optimization solution formulation and decision-making parameter may be a parameter related to an optimization solution formulation and/or decision-making process and may include a parameter used to indicate whether a person needs to participate in optimization solution formulation, optimization solution formulation duration, duration of human participation in optimization solution formulation, a parameter used to indicate whether a person needs to participate in optimization solution decision-making, optimization solution decision-making duration, duration of human participation in optimization solution decision-making, optimization solution decision-making accuracy, or the like.

The intent requirement decomposition parameter may be a parameter related to an optimization intent and may include a parameter used to indicate whether a person needs to participate in dynamic optimization policy update, dynamic optimization policy update duration, duration of human participation in dynamic optimization policy update, dynamic optimization policy update accuracy, a parameter used to indicate whether network optimization can be implemented based on the optimization intent, or the like.

In the network maintenance scenario, the network system performs a network maintenance process, and may include a fault maintenance scenario. The process may include a process such as fault data collection, fault association and compression, fault root cause analysis, fault processing solution generation and decision-making, fault processing solution execution, and/or fault prediction. The operation and maintenance parameter in this scenario may include at least one of a fault processing solution execution parameter, a data collection parameter (also referred to as a fault presentation parameter), a fault compression parameter, a fault root cause analysis parameter, a fault locating parameter, a fault prediction parameter, a fault processing solution decision-making parameter, or the like.

The fault processing solution execution parameter may be a parameter related to a fault processing solution execution process and may include at least of a parameter used to indicate whether a person needs to participate in fault processing solution execution, fault processing solution execution duration, duration of human participation in fault processing solution execution, or the like. The fault processing solution refers to a solution that is executed after a fault occurs, to resolve the fault or reduce impact caused by the fault.

The data collection parameter may be a parameter related to a fault data collection process and may include at least one of a parameter used to indicate whether a person needs to participate in data collection, data collection duration, duration of human participation in data collection, a parameter used to indicate validity of collected data, or the like. The fault data (also referred to as data) is network alarm information, also referred to as fault information, and is used to indicate a fault that occurs and/or a fault cause, for example, a board fault. This is not limited in the embodiments. The parameter used to indicate validity of collected data may be used to indicate whether the alarm information is a valid alarm. If the alarm information is determined to be an invalid alarm, the parameter indicates that the alarm information is invalid.

The fault compression parameter may be a parameter related to a fault compression process and may include a fault data compression rate. The following describes the fault compression process by using an example in which the fault data is alarm information. When a plurality of pieces of alarm information with same content are continuously sent, the plurality of pieces of alarm information may be sent after being compressed, thereby reducing a quantity of pieces of alarm information. A rate for compression is a compression rate, and a purpose of compressing the fault data includes reducing associated fault data and preventing resources from being excessively occupied by a same fault.

The fault root cause analysis parameter may be a parameter related to fault root cause analysis and may include at least one of a parameter used to indicate whether a person needs to participate in root cause analysis, root cause analysis duration, duration of human participation in root cause analysis, or the like. The root cause analysis refers to analyzing a root cause of an alarm.

The fault locating parameter may be a parameter related to a fault locating process and may include at least one of a parameter used to indicate whether a person needs to participate in fault locating, fault locating accuracy, or the like. The fault locating process is used to locate a faulty node.

The fault prediction parameter may be a parameter related to a fault prediction process and may include at least one of a parameter used to indicate whether fault prediction can be performed, a parameter used to indicate whether a person needs to participate in fault prediction, fault prediction accuracy, a fault prediction period, or the like.

The fault processing solution decision-making parameter may be a parameter related to a fault processing solution decision-making process and may include at least one of a parameter used to indicate whether a person needs to participate in fault processing solution decision-making, fault processing solution decision-making duration, duration of human participation in fault processing solution decision-making, fault processing solution decision-making accuracy, a fault recovery success rate, or the like.

In the service operation scenario, the network system executes a service operation process, and the service operation process may include a process such as service requirement mapping, service provisioning, and/or service performance presentation. The operation and maintenance parameter in this scenario may include at least one of a service requirement mapping parameter, a service provisioning parameter, a service evaluation parameter, a service performance presentation parameter, or the like.

The service requirement mapping parameter may be a parameter related to a service requirement mapping process and may include a parameter used to indicate whether a person needs to participate in a process of mapping from a service requirement to a network requirement, duration of mapping from a service requirement to a network requirement, or duration of human participation in mapping from a service requirement to a network requirement.

The service provisioning parameter may be a parameter related to a service provisioning process and may include a parameter used to indicate whether a person needs to participate in the service provisioning process, duration of the service provisioning process, duration of human participation in the service provisioning process, or service provisioning accuracy.

The service performance presentation parameter may be a parameter related to a service performance presentation process and may include a parameter used to indicate whether a person needs to participate in service evaluation, service evaluation duration, a parameter used to indicate whether a person needs to participate in service performance presentation, service performance presentation duration, or a parameter used to indicate whether service performance can be presented.

It should be understood that operation and maintenance scenarios supported by different network systems may be the same or different. When the procedure shown in FIG. 3 is performed, an operation and maintenance scenario may be selected from the operation and maintenance scenarios supported by the network system, an operation and maintenance parameter of the network system in the operation and maintenance scenario is obtained, and an automation level of the network system in the operation and maintenance scenario is further determined.

In addition, the operation and maintenance parameter in the embodiments may be a statistical value of an operation and maintenance process in an operation and maintenance scenario. For example, in the network planning scenario, statistics on network planning duration can be collected, and the statistical value is used as statistical planning duration and stored locally. When step S101 is performed, the statistical planning duration is obtained locally and used as the operation and maintenance parameter. For another example, the operation and maintenance parameter may be obtained through statistics collection by a statistical apparatus based on an operation and maintenance process in an operation and maintenance scenario. The statistical apparatus may be a site or a subsystem in a to-be-evaluated network system, a function module or a chip in the site, or a function module or a chip in the subsystem. Alternatively, the statistical apparatus may be a site, a system, a device, or a chip other than the to-be-evaluated network system. After obtaining the operation and maintenance parameter, the statistical apparatus may locally store the operation and maintenance parameter, or store the operation and maintenance parameter in the network system. For example, the statistical apparatus may correspond to one or more network systems, and is configured to collect statistics on operation and maintenance parameters of the one or more network systems.

For example, the statistical collection apparatus may be a same apparatus as the automatic level division apparatus configured to perform this embodiment. For example, the statistical apparatus and the automatic level division apparatus are both sites in the to-be-evaluated network system. Therefore, when performing step S101, the automatic level division apparatus may obtain the locally stored operation and maintenance parameter. In addition, a case in which the statistical apparatus and the automatic level division apparatus may be different devices is not excluded in the embodiments. For example, the statistical apparatus and the automatic level division apparatus are different sites in the to-be-evaluated network system. In this case, when performing step S101, the automatic level division apparatus may obtain the operation and maintenance parameter from the statistical apparatus.

S102: Determine an automation level of the network system in the operation and maintenance scenario based on the operation and maintenance parameter of the network system in the operation and maintenance scenario, where the automation level of the network system in the operation and maintenance scenario is used to represent an automatic operation and maintenance degree of the network system in the operation and maintenance scenario.

When step S102 is performed, one of a plurality of reference automation levels may be determined as the automation level of the network system in the operation and maintenance scenario based on the operation and maintenance parameter of the network system in the operation and maintenance scenario and evaluation information of a reference automation level in the operation and maintenance scenario. The evaluation information of the reference automation level may be used to determine whether the automation level of the network system in the operation and maintenance scenario meets the reference automation level. When the operation and maintenance parameter of the network system in the operation and maintenance scenario meets the evaluation information of the reference automation level, it may be determined that the automation level of the network system in the operation and maintenance scenario meets the reference automation level; and/or when the operation and maintenance parameter of the network system in the operation and maintenance scenario does not meet the evaluation information of the reference automation level, it may be determined that the automation level of the network system in the operation and maintenance scenario does not meet the reference automation level.

In a possible example, the evaluation information of the reference automation level may include characteristic information of the reference automation level, for example, some or all of information such as complexity information of a network system corresponding to the reference automation level, a quantity of sites (and/or subsystems) included in the network system, or network system establishment time. For example, when the network system is highly complex, includes a large quantity of sites, or has been established for a relatively long period of time, the automation level of the network system is limited to some extent. Consequently, highly automatic operation and maintenance cannot be implemented.

In another possible example, the evaluation information of the reference automation level may include level information corresponding to the reference automation level, for example, an operation and maintenance performance evaluation indicator corresponding to the reference automation level. The operation and maintenance performance indicator may be a threshold of an operation and maintenance parameter in an operation and maintenance scenario, and the operation and maintenance performance evaluation indicator may be used to compare operation and maintenance parameters of the to-be-evaluated network system in the operation and maintenance scenario, to determine, based on a comparison result, whether the network system meets a reference automation level corresponding to the operation and maintenance performance evaluation indicator.

For example, when one of the plurality of reference automation levels is determined as the automation level of the network system in the operation and maintenance scenario, one of the plurality of reference automation levels may be determined as the automation level of the network system in the operation and maintenance scenario based on the operation and maintenance performance evaluation indicator corresponding to the reference automation level.

The correspondence between the reference automation level and the operation and maintenance performance evaluation indicator may be preset. For example, in the site deployment scenario, an operation and maintenance performance evaluation indicator corresponding to a reference automation level includes: full configuration parameter generation duration is less than 2 hours, duration of human participation in full configuration parameter generation is 0 hours, and a parameter used to indicate completeness of full configuration data is greater than 95%. In this case, when the automation level of the network system in a key deployment scenario is determined, it may be separately determined, in the operation and maintenance parameters of the to-be-evaluated network system in the site deployment scenario, whether the full configuration parameter generation duration is less than 2 hours, whether the duration of human participation in full configuration parameter generation is 0 hours, and whether the parameter used to indicate completeness of full configuration data is greater than 95%. If yes, it is determined that the operation and maintenance parameters meet the operation and maintenance performance evaluation indicator of the reference automation level. Otherwise, if a result of any one time of determining is no, it is determined that the operation and maintenance parameters do not meet the operation and maintenance performance evaluation indicator of the reference automation level.

For example, when one of the plurality of reference automation levels is determined as the automation level of the network system in the operation and maintenance scenario, a reference automation level of the highest level may be selected from the plurality of reference automation levels as the automation level of the network system in the operation and maintenance scenario, where the operation and maintenance parameter of the network system in the operation and maintenance scenario meets evaluation information of the selected reference automation level of the highest level. In other words, the reference automation level that represents the highest automation degree can be selected from one or more reference automation levels corresponding to the evaluation information that the operation and maintenance parameter meets as the automation level of the network system in the operation and maintenance scenario.

For example, automation degrees respectively represented by a first network automation level, a second network automation level, a third network automation level, a fourth network automation level, and a fifth network automation level increase in ascending order. If the operation and maintenance parameters of the to-be-evaluated network system in the site deployment scenario separately meet evaluation information of the first network automation level, evaluation information of the second network automation level, and evaluation information of the third network automation level, and the operation and maintenance parameters do not meet evaluation information of the fourth network automation level and evaluation information of the fifth network automation level, the third network automation level may be determined as the automation level of the network system in the site deployment scenario.

Based on the correspondence between the reference automation level and the operation and maintenance performance evaluation indicator, an implementation may be as follows: if it is determined that the operation and maintenance parameter of the network system in the operation and maintenance scenario meets the evaluation information of the first reference automation level, and the operation and maintenance parameter of the network system in the operation and maintenance scenario does not meet the evaluation information of the second reference automation level, it is determined that the automation level of the network system in the operation and maintenance scenario is the first reference automation level, where the second reference automation level and the first reference automation level are adjacent levels, and an automation degree represented by the second reference automation level is higher than an automation degree represented by the first reference automation level. In still another implementation, if the operation and maintenance parameter of the network system in the operation and maintenance scenario meets the evaluation information of the third reference automation level, it is determined that the automation level of the network system in the operation and maintenance scenario is the third reference automation level, where an automation degree represented by the third reference automation level is higher than automation degrees represented by all reference automation levels except the third reference automation level.

For example, it is assumed that current reference automation levels include the first network automation level, the second network automation level, the third network automation level, the fourth network automation level, and the fifth network automation level. Each reference automation level corresponds to a respective operation and maintenance performance evaluation indicator. The automation degrees respectively represented by the first network automation level, the second network automation level, the third network automation level, the fourth network automation level, and the fifth network automation level increase in ascending order or decrease in descending order. This is not limited in the embodiments.

The following uses an example in which the evaluation information of the reference automation level includes the operation and maintenance performance evaluation indicator corresponding to the reference automation level for description. For example, the automation degrees respectively represented by the first network automation level, the second network automation level, the third network automation level, the fourth network automation level, and the fifth network automation level increase in ascending order. If the operation and maintenance parameters of the to-be-evaluated network system in the site deployment scenario include: duration of human participation in full configuration data generation is 1 hour, and the operation and maintenance performance evaluation indicator corresponding to the first network automation level includes: duration of human participation in full configuration data generation is greater than 0, in the operation and maintenance performance evaluation indicator corresponding to the second network automation level and an operation and maintenance performance evaluation indicator corresponding to a reference automation level of a higher automation level, the duration of human participation in full configuration data generation is 0. Therefore, the operation and maintenance parameters of the to-be-evaluated network system in the site deployment scenario meet the operation and maintenance performance evaluation indicator corresponding to the first network automation level, but does not meet the operation and maintenance performance evaluation indicator corresponding to the second network automation level. In this case, the second network automation level and the reference automation level of the higher automation level are excluded, and the first network automation level is selected as the automation level of the network system in the site deployment scenario.

For still another example, the automation degrees respectively represented by the first network automation level, the second network automation level, the third network automation level, the fourth network automation level, and the fifth network automation level increase in ascending order. If the operation and maintenance parameters of the to-be-evaluated network system in the site deployment scenario include: duration of human participation in full configuration data generation is 0 hours, and the operation and maintenance performance evaluation indicator corresponding to the fifth network automation level includes a: duration of human participation duration in full configuration data generation is 0, the operation and maintenance parameters of the to-be-evaluated network system in the site deployment scenario meet the operation and maintenance performance evaluation indicator corresponding to the fifth network automation level. Because the fifth network automation level represents the highest automation degree, the fifth network automation level is selected as the automation level of the network system in the site deployment scenario.

In an optional manner, a reference automation level may be selected from a plurality of reference automation levels based on represented automation degrees that increase in ascending order or decrease in descending order, and it is determined whether the operation and maintenance parameters of the to-be-evaluated network system in the operation and maintenance scenario meet the evaluation information of the reference automation level. For example, if the automation degrees increase in ascending order, after it is determined that the operation and maintenance parameters of the to-be-evaluated network system in the operation and maintenance scenario meet evaluation information of a reference automation level, a next reference automation level is selected, and it is determined whether the operation and maintenance parameters meet evaluation information of the next reference automation level. If the operation and maintenance parameters meet the evaluation information of the next reference automation level, a next reference automation level continues to be selected; if the operation and maintenance parameters don't meet the evaluation information of the next reference automation level, a previous reference automation level that meets the evaluation information is used as the automation level of the network system in the operation and maintenance scenario. For another example, if the automation degrees decrease in descending order, after it is determined that the operation and maintenance parameters of the to-be-evaluated network system in the operation and maintenance scenario do not meet evaluation information of a reference automation level, a next reference automation level is selected, and it is compared whether the operation and maintenance parameters meet evaluation information of the next reference automation level. If yes, the reference automation level that meets the evaluation information is used as the automation level of the network system in the operation and maintenance scenario; if no, a reference automation level continues to be selected, and the operation and maintenance parameters continues to be compared with evaluation information of the next reference automation level.

It can be understood that according to the method shown in FIG. 3, an operation and maintenance parameter of the network system in a specific operation and maintenance scenario may be obtained, and an automation level of the network system in the specific operation and maintenance scenario is determined based on the operation and maintenance parameter, to implement level division of automation degrees of the network system in the specific operation and maintenance scenario.

During implementation of the embodiments, the automation level of the network system may be alternatively determined based on an automation level of the network system in one or more operation and maintenance scenarios supported by the network system.

In a specific example, if the network system supports one operation and maintenance scenario, an automation level of the network system in the operation and maintenance scenario may be determined as the automation level of the network system. In another specific example, if the network system supports a plurality of operation and maintenance scenarios, an automation level that represents the lowest automation degree in a plurality of automation levels of the network system in the plurality of operation and maintenance scenarios supported by the network system may be determined as the automation level of the network system, or an automation level that represents the highest automation degree in a plurality of automation levels of the network system in the plurality of operation and maintenance scenarios supported by the network system may be determined as the automation level of the network system.

In a possible implementation, in an optional manner, the automation level of the network system may be determined by using an average value of values corresponding to automation levels of the network system in operation and maintenance scenarios.

For example, a value corresponding to the automation level of the network system may be determined according to the following formula:

$$L = \frac{\sum_{i=1}^{N} L_i}{N}, \quad \text{(formula 1)}$$

where

L represents the value corresponding to the automation level of the network system, $L_i$ represents a value corresponding to an automation level of the network system in an $i^{th}$ operation and maintenance scenario, i is a positive integer, $1 \leq i \leq N$, and N is a quantity of operation and maintenance scenarios supported by the network system.

Further, rounding up or rounding down may be performed on the value L determined according to the foregoing formula, and an automation level corresponding to a rounding result is the automation level corresponding to the network system.

It is assumed that the operation and maintenance scenarios supported by the network system include N operation and maintenance scenarios, and the first network automation level, the second network automation level, the third network automation level, the fourth network automation level, and the fifth network automation level are respectively quantized as values 1 to 5. The operation and maintenance scenarios supported by the network system include an operation and maintenance scenario A, an operation and maintenance scenario B, and an operation and maintenance scenario C. In addition, it is learned that an automation level of the network system in the operation and maintenance scenario A is the second network automation level, and a value corresponding to the automation level is 2; an automation level of the network system in the operation and maintenance scenario B is the third network automation level, and a value corresponding to the automation level is 3; an automation level of the network system in the operation and maintenance scenario C is the fifth network automation level, and a value corresponding to the automation level is 5. In this case, L=3.33 may be determined according to the formula 1. Rounding up is performed on L, and it can be learned that the automation level of the network system is the fourth network automation level. Alternatively, rounding down is performed on L, and it can be learned that the automation level of the network system is the third network automation level.

In another optional manner, a weighted average value of automation levels of the network system in the plurality of operation and maintenance scenarios may be calculated based on a weight corresponding to each of the plurality of operation and maintenance scenarios supported by the network system, and the automation level of the network system may be determined based on a calculation result. Weights corresponding to operation and maintenance scenarios can be set based on importance of different operation and maintenance scenarios. For example, a value corresponding to the automation level of the network system may be determined according to the following formula:

$$L = \sum_{i=1}^{N} L_i * q_i, \quad \text{(formula 2)}$$

where L represents the value corresponding to the automation level of the network system, $L_i$ represents a value corresponding to an automation level of the network system in an $i^{th}$ operation and maintenance scenario, $q_i$ represents a corresponding weight of the network system in the $i^{th}$ operation and maintenance scenario, i is a positive integer, $1 \leq i \leq N$, and N is a quantity of operation and maintenance scenarios. For example, $\Sigma_{i=1}^{N} q_i = 1$, and before calculation, normalization processing may be performed on $q_i$.

Further, rounding up or rounding down may be performed on the value L determined according to the foregoing formula, and an automation level corresponding to a rounding result is the automation level corresponding to the network system.

The plurality of operation and maintenance scenarios supported by the network system include an operation and maintenance scenario A, an operation and maintenance scenario B, and an operation and maintenance scenario C. In addition, it is learned that an automation level of the network system in the operation and maintenance scenario A is the second network automation level, a value corresponding to the automation level is 2, and a weight corresponding to the operation and maintenance scenario A is 0.6; an automation level of the network system in the operation and maintenance scenario B is the third network automation level, a value corresponding to the automation level is 3, and a weight corresponding to the operation and maintenance scenario B is 0.3; an automation level of the network system in the operation and maintenance scenario C is the fifth network automation level, a value corresponding to the automation level is 5, and a weight corresponding to the operation and maintenance scenario C is 0.1. In this case, L=2.6 may be determined according to the formula 2. Rounding up is performed on L, and it can be learned that the automation level of the network system is the third network automation level. Alternatively, rounding down is performed on L, and it can be learned that the automation level of the network system is the second network automation level.

For example, if the automation degrees respectively represented by the first network automation level, the second network automation level, the third network automation level, the fourth network automation level, and the fifth network automation level increase in ascending order, rounding down may be performed on L that is determined by using the formula 1 and/or the formula 2. If the automation degrees respectively represented by the first network automation level, the second network automation level, the third network automation level, the fourth network automation level, and the fifth network automation level decrease in descending order, rounding up may be performed on L that is determined by using the formula 1 and/or the formula 2.

The plurality of network scenarios supported by the network system may include at least one of the network deployment scenario, the network optimization scenario, the network maintenance scenario, the network planning scenario, or the service operation scenario. For a manner of determining the automation levels of the network system in the plurality of network scenarios supported by the network system, refer to the foregoing manner of determining the automation level of the network system in the network scenario. Details are not described again.

It should be understood that the automatic level division apparatus may determine the plurality of operation and maintenance scenarios supported by the network system, and the automatic level division apparatus determines the automation level of the network system based on the plurality of automation levels of the network system in the at least one operation and maintenance scenario.

Figure 4:
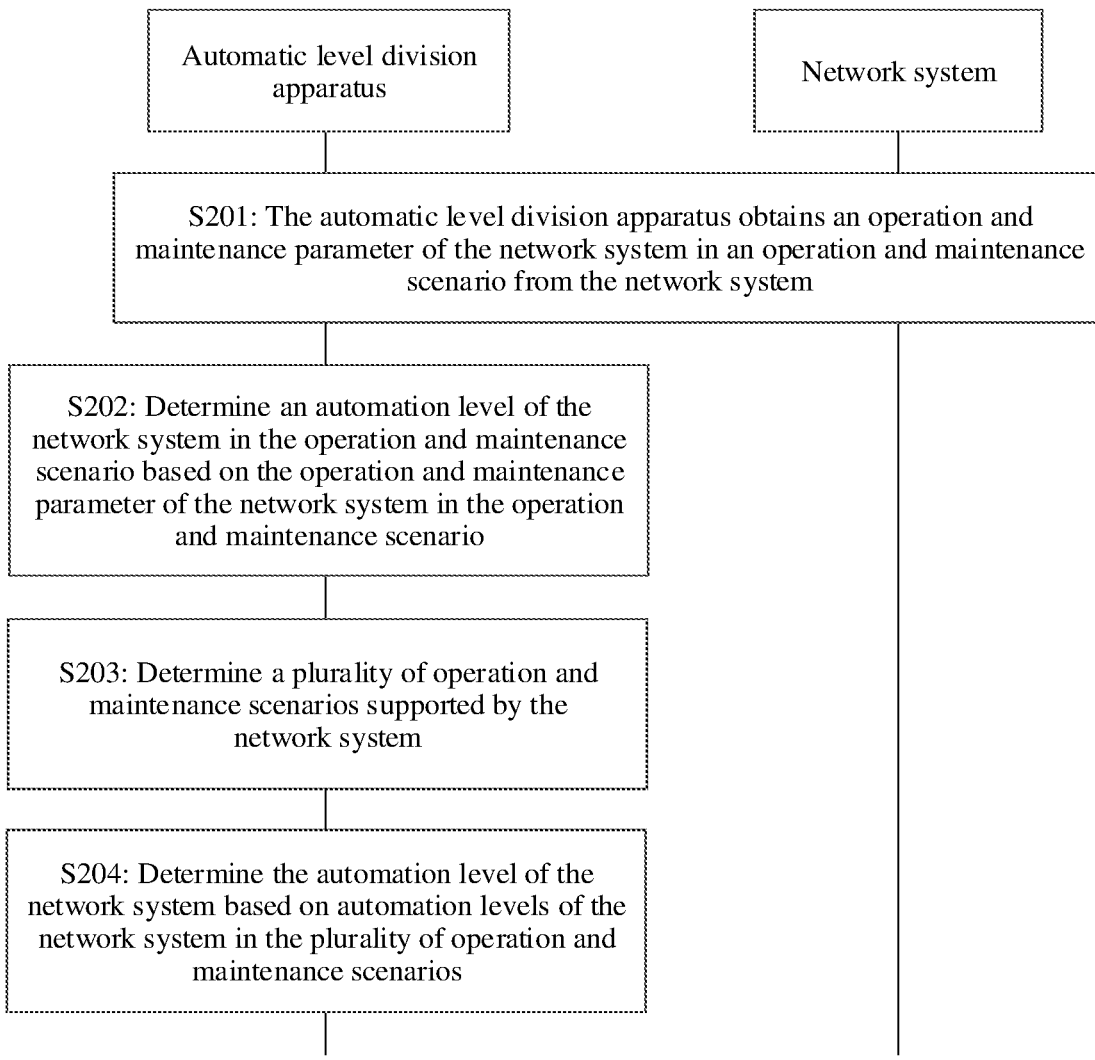
FIG. 4 is a schematic flowchart of another network system level division method according to an embodiment.

Steps of the network system level division method provided in this embodiment are described below by using an example in which the automatic level division apparatus is as an execution body. As shown in FIG. 4, the method may include the following steps:

S201: The automatic level division apparatus obtains an operation and maintenance parameter of a network system in an operation and maintenance scenario from the network system.

The operation and maintenance parameter is stored in the network system. The operation and maintenance parameter of the network system in the operation and maintenance scenario may be obtained through statistics collection based on an operation and maintenance process of the network system in the operation and maintenance scenario.

For example, during implementation of S201, the automatic level division apparatus may request to obtain the operation and maintenance parameter from the network system, and receive the operation and maintenance parameter from the network system.

S202: The automatic level division apparatus determines an automation level of the network system in the operation and maintenance scenario based on the operation and maintenance parameter of the network system in the operation and maintenance scenario.

S203: The automatic level division apparatus determines a plurality of operation and maintenance scenarios supported by the network system. The plurality of operation and maintenance scenarios include the operation and maintenance scenario described in S201.

S204: The automatic level division apparatus determines the automation level of the network system based on automation levels of the network system in the plurality of operation and maintenance scenarios.

The automation levels of the network system in the plurality of operation and maintenance scenarios include the automation level of the network system in the operation and maintenance scenario in S202.

According to the foregoing procedure, the automatic level division apparatus may determine the automation level of the network system in the operation and maintenance scenario based on the operation and maintenance parameter of the network system in the operation and maintenance scenario. Further, the automatic level division apparatus may determine the automation level of the network system based on the automation levels of the network system in the plurality of operation and maintenance scenarios. In this way, evaluation of the automation level of the network system is realized.

It should be understood that a time sequence of step S203 is not strictly limited in the embodiments. The step may be performed after S202 and before S204, or may be performed before S201 or S202. For specific implementations of S201 to S204, refer to corresponding descriptions in the foregoing method embodiments. Details are not described herein again.

Based on a same concept as that in the foregoing method embodiments, an embodiment further provides an apparatus. The apparatus may have a function of the automatic level division apparatus in the foregoing method embodiments, and may be configured to perform steps performed by the automatic level division apparatus provided in the foregoing method embodiments. The function may be implemented by hardware, or may be implemented by software or hardware executing corresponding software. The hardware or the software includes one or more modules corresponding to the foregoing function.

Figure 5:
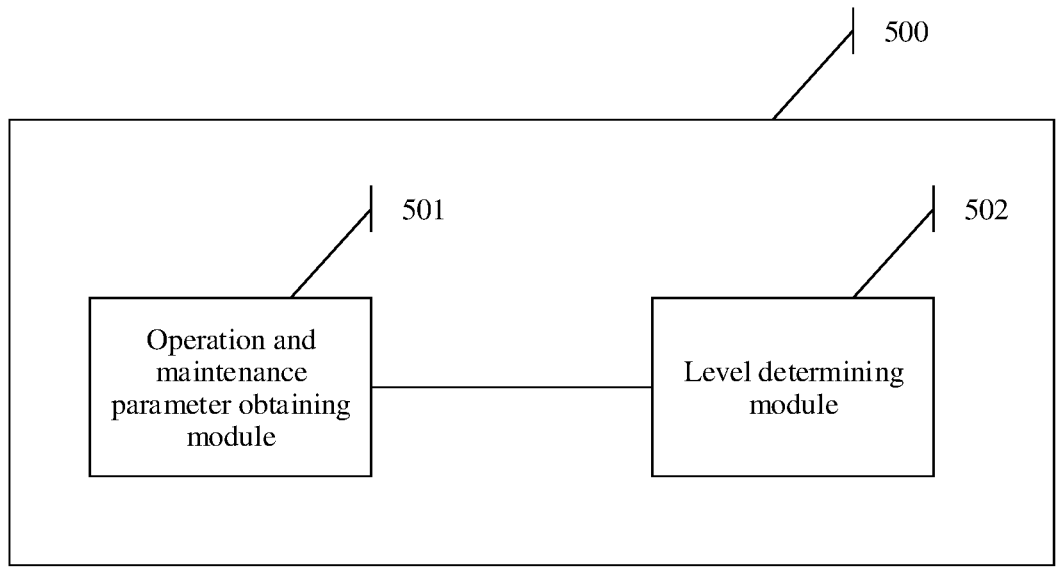
FIG. 5 is a schematic diagram of a structure of an apparatus according to the embodiments.

In a possible implementation, an apparatus 500 shown in FIG. 5 may be used as the automatic level division apparatus in the foregoing method embodiments, and is configured to perform the steps shown in the foregoing method embodiments. The apparatus 500 may be a site, a component of the site, or a subsystem, or a component of the subsystem in a to-be-evaluated network system, or the apparatus 500 may be a site, a system, a device, or a chip other than the to-be-evaluated network system. As shown in FIG. 5, the apparatus 500 may include an operation and maintenance parameter obtaining module 501 and a level determining module 502. The operation and maintenance parameter obtaining module 501 and the level determining module 502 are coupled to each other.

When the steps shown in the foregoing method embodiments are performed, the operation and maintenance parameter obtaining module 501 may be configured to obtain an operation and maintenance parameter of a network system in an operation and maintenance scenario, where the operation and maintenance parameter is used to represent operation and maintenance performance of the network system in the operation and maintenance scenario; and the level determining module 502 may be configured to determine an automation level of the network system in the operation and maintenance scenario based on the operation and maintenance parameter of the network system in the operation and maintenance scenario, where the automation level of the network system in the operation and maintenance scenario is used to represent an automatic operation and maintenance degree of the network system in the operation and maintenance scenario.

When the automation level of the network system in the operation and maintenance scenario is determined based on the operation and maintenance parameter of the network system in the operation and maintenance scenario, the level determining module 502 may be configured to determine, based on the operation and maintenance parameter of the network system in the operation and maintenance scenario and evaluation information of each of a plurality of reference automation levels in the operation and maintenance scenario, one of the plurality of reference automation levels as the automation level of the network system in the operation and maintenance scenario.

The evaluation information of the reference automation level may include characteristic information of the reference automation level, for example, some or all of information such as complexity information of a network system corresponding to the reference automation level, a quantity of sites (and/or subsystems) included in the network system, or network system establishment time. In addition, the evaluation information of the reference automation level may include level information corresponding to the reference automation level. For example, the level information corresponding to the reference automation level is an operation and maintenance performance evaluation indicator corresponding to the reference automation level.

For example, the level determining module 502 may be configured to select a reference automation level of the highest level from the plurality of reference automation levels as the automation level of the network system in the operation and maintenance scenario, where the operation and maintenance parameter of the network system in the operation and maintenance scenario meets evaluation information of the selected reference automation level of the highest level.

In a specific example, when the level determining module 502 is configured to determine, based on the operation and maintenance parameter of the network system in the operation and maintenance scenario and evaluation information of each of the plurality of reference automation levels in the operation and maintenance scenario, one of the plurality of reference automation levels as the automation level of the network system in the operation and maintenance scenario, the level determining module 502 may be configured to: if the operation and maintenance parameter of the network system in the operation and maintenance scenario meets evaluation information of a first reference automation level, and the operation and maintenance parameter of the network system in the operation and maintenance scenario does not meet evaluation information of a second reference automation level, determine that the automation level of the network system in the operation and maintenance scenario is the first reference automation level, where the second reference automation level and the first reference automation level are adjacent levels, and an automation degree represented by the second reference automation level is higher than an automation degree represented by the first reference automation level.

In another example, when the level determining module 502 may be configured to determine, based on the operation and maintenance parameter of the network system in the operation and maintenance scenario and evaluation information of each of the plurality of reference automation levels in the operation and maintenance scenario, one of the plurality of reference automation levels as the automation level of the network system in the operation and maintenance scenario, the level determining module 502 may be configured to: if the operation and maintenance parameter of the network system in the operation and maintenance scenario meets evaluation information of a third reference automation level, determine that the automation level of the network system in the operation and maintenance scenario is the third reference automation level, where an automation degree represented by the third reference automation level is higher than automation degrees represented by all reference automation levels except the third reference automation level.

For a meaning and content of the operation and maintenance scenario, refer to descriptions of the operation and maintenance scenario in the foregoing method embodiments. For a meaning and content of the operation and maintenance parameter, refer to descriptions of the operation and maintenance parameter in the foregoing method embodiments. Details are not described herein again.

For example, the level determining module 502 may be further configured to: determine a plurality of operation and maintenance scenarios supported by the network system, where the plurality of operation and maintenance scenarios include the operation and maintenance scenario; and determine the automation level of the network system based on automation levels of the network system in the plurality of operation and maintenance scenarios.

Figure 6:
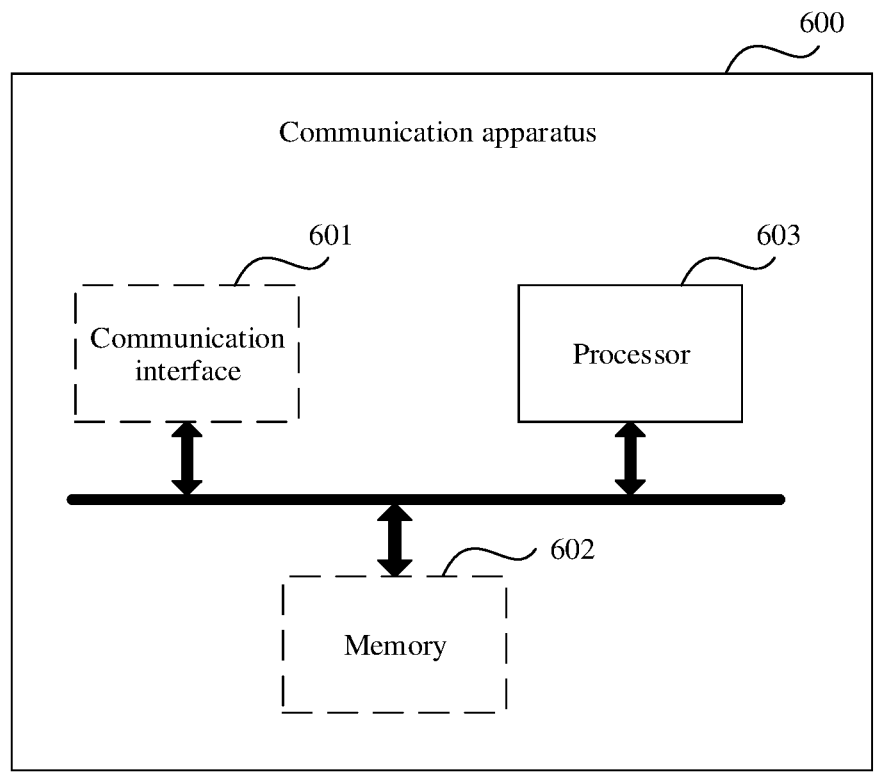
FIG. 6 is a schematic diagram of a structure of another apparatus according to the embodiments.

In another implementation, an apparatus provided in this embodiment may further include a hardware component. For example, the hardware component may include a processor, a memory, a transceiver, or the like. For example, a structure of the apparatus may be shown in FIG. 6. For ease of understanding, FIG. 6 shows only a structure necessary for the apparatus to perform the method shown in the embodiments. That the apparatus may have more components is not limited in the embodiments. A communication apparatus 600 may include a communication interface 601, a memory 602, and a processor 603. The communication interface 601 ay be used by the communication apparatus 600 to perform communication, for example, to send or receive a signal. For example, the communication interface 601 may be used by the communication apparatus 600 to send and receive the signal in a wired manner. For example, the communication interface 601 may be used by the communication apparatus 600 to perform wired communication with another site in a network system. The memory 602 is coupled to the processor 603, and is configured to store a program and data that are necessary for implementing functions of the communication apparatus 600. The processor 603 is configured to support the communication apparatus 600 in performing corresponding processing functions in the foregoing methods. The memory 602 and the processor 603 may be integrated or may be independent of each other.

Alternatively, the memory 602 may be externally connected to the communication apparatus 600. In this case, the communication apparatus 600 may include the communication interface 601 and the processor 603. In addition, if both the communication interface 601 and the memory 602 are externally connected to the communication apparatus 600, the communication apparatus 600 may include the processor 603. Alternatively, the communication interface may be externally connected to the communication apparatus 600. In this case, the communication apparatus 600 may include the processor 603.

It should be understood that the foregoing operation and maintenance parameter obtaining module 501 may be implemented by the processor 603, or may be implemented by the processor 603 and the memory 602. In addition, the foregoing level determining module 502 may be implemented by the processor 603, or may be implemented by the processor 603 and the memory 602.

When the foregoing apparatus is implemented by using the structure shown in FIG. 6, the processor 603 may perform the steps performed by the foregoing operation and maintenance parameter obtaining module 501 and/or the level determining module 502. The memory 602 may be configured to store a program, and the processor 603 invokes the program to perform the steps performed by the operation and maintenance parameter obtaining module 501 and/or the level determining module 502.

It should be understood that the components included in the apparatus in the foregoing embodiments are examples, are merely possible examples, and may have another composition manner during actual implementation. In addition, the components in the foregoing apparatus may be integrated into one module, or may exist alone physically. The foregoing integrated module may be implemented in a form of hardware, or may be implemented in a form of a software function module. It should not be understood that the structure shown in the foregoing accompanying drawings is limited.

Based on a same concept as that of the foregoing method embodiments, the embodiments further provides a computer-readable storage medium. The computer-readable storage medium stores a computer program. When the program is executed by a processor, the computer is enabled to perform operations performed by the automatic level division apparatus in any one of the foregoing method embodiments or the possible implementations of the method embodiments.

Based on a same concept as that of the foregoing method embodiments, the embodiments further provide a computer program product. When the computer program product is invoked and executed by a computer, the computer may be enabled to implement operations performed by the automatic level division apparatus in any one of the foregoing method embodiments or the possible implementations of the method embodiments.

Based on a same concept as that of the foregoing method embodiments, the embodiments further provide a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement operations performed by the automatic level division apparatus in any one of the foregoing method embodiments or the possible implementations of the method embodiments. The chip system may include the chip, or may include the chip and another discrete component, such as a memory (or a storage module) and/or a transceiver (or a communication module).

Based on a same concept as that of the foregoing method embodiments, the embodiments further provide a communication system. The communication system may be configured to implement operations performed by a terminal device, a first access network device, a second access network device, or a management device in any one of the foregoing method embodiments or the possible implementations of the method embodiments. For example, the communication system has a structure shown in FIG. 1 or FIG. 2.

The embodiments are described with reference to flowcharts and/or block diagrams of the method, the apparatus, and the computer program product in the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer, or the another programmable device, provide steps for implementing a specific function in one or more procedures in the flowcharts and/or in one or more blocks in the block diagrams.

What is claimed is:

1. A network system level division method comprising:
    obtaining an operation and maintenance parameter of a network system in a first operation and maintenance scenario, wherein the operation and maintenance parameter is used to represent operation and maintenance performance of the network system in the first operation and maintenance scenario;
    determining a first automation level of the network system in the first operation and maintenance scenario based on the operation and maintenance parameter of the network system in the first operation and maintenance scenario, wherein the first automation level of the network system in the first operation and maintenance scenario is used to represent an automatic operation and maintenance degree of the network system in the first operation and maintenance scenario,
    calculating, based on a weight corresponding to each of a plurality of operation and maintenance scenarios supported by the network system, a weighted average value of automation levels of the network system in the plurality of operation and maintenance scenarios supported by the network system, wherein the plurality of operation and maintenance scenarios comprises the first operation and maintenance scenario; and
    obtaining an automation level of the network by performing one of:
    rounding up on the weighted average value when automation degrees respectively represented by automation levels increase in an ascending order of the automation levels; or
    rounding down on the weighted average value when automation degrees respectively represented by automation levels decrease in a descending order of the automation levels.

2. The network system level division method according to claim 1, wherein the plurality of operation and maintenance scenarios comprises at least two of a site deployment scenario, a network deployment scenario, a network optimization scenario, a network maintenance scenario, a network planning scenario, or a service operation scenario.

3. The network system level division method according to claim 2, wherein, when the operation and maintenance scenario comprises the site deployment scenario, the operation and maintenance parameter comprises at least one of the following parameters:

a site planning parameter, a full configuration data generation parameter, a site provisioning parameter, or a site acceptance parameter.

4. An apparatus, comprising a processor, wherein the processor is configured to invoke instructions stored in a memory, to:
obtain an operation and maintenance parameter of a network system in a first operation and maintenance scenario, wherein the operation and maintenance parameter is used to represent operation and maintenance performance of the network system in the first operation and maintenance scenario;
determine a first automation level of the network system in the first operation and maintenance scenario based on the operation and maintenance parameter of the network system in the first operation and maintenance scenario, wherein the first automation level of the network system in the first operation and maintenance scenario is used to represent an automatic operation and maintenance degree of the network system in the first operation and maintenance scenario;
calculate, based on a weight corresponding to each of a plurality of operation and maintenance scenarios supported by the network system, a weighted average value of automation levels of the network system in the plurality of operation and maintenance scenarios supported by the network system, wherein the plurality of operation and maintenance scenarios comprises the first operation and maintenance scenario; and
obtain an automation level of the network by performing one of:
rounding up on the weighted average value when automation degrees respectively represented by automation levels increase in an ascending order of the automation levels; or
rounding down on the weighted average value when automation degrees respectively represented by automation levels decrease in a descending order of the automation levels.

5. The apparatus according to claim 4, wherein the processor is further configured to invoke the instructions to:
determine, based on the operation and maintenance parameter of the network system in the operation and maintenance scenario and evaluation information of a plurality of reference automation levels in the operation and maintenance scenario, one of the plurality of reference automation levels as the determined automation level of the network system in the operation and maintenance scenario.

6. The apparatus according to claim 5, wherein the evaluation information of the automation level of the network system comprises level information corresponding to the automation level.

7. The apparatus according to claim 5, wherein the processor is further configured to invoke the instructions to:
select a reference automation level of the highest level from the plurality of reference automation levels as the selected automation level of the network system in the operation and maintenance scenario, wherein the operation and maintenance parameter of the network system in the operation and maintenance scenario meets evaluation information of the selected reference automation level of the highest level.

8. The apparatus according to claim 5, wherein the processor is further configured to invoke the instructions to:
in response to finding that the operation and maintenance parameter of the network system in the operation and maintenance scenario meets evaluation information of a first reference automation level, and the operation and maintenance parameter of the network system in the operation and maintenance scenario does not meet evaluation information of a second reference automation level, determine that the automation level of the network system in the operation and maintenance scenario is the first reference automation level, wherein the second reference automation level and the first reference automation level are adjacent levels, and an automation degree represented by the second reference automation level is higher than an automation degree represented by the first reference automation level.

9. The apparatus according to claim 5, wherein the processor is further configured to invoke the instructions to:
in response to finding that the operation and maintenance parameter of the network system in the operation and maintenance scenario meets evaluation information of a third reference automation level, determine that the automation level of the network system in the operation and maintenance scenario is the third reference automation level, wherein an automation degree represented by the third reference automation level is higher than automation degrees represented by all reference automation levels except the third reference automation level.

10. The apparatus according to claim 4, wherein the operation and maintenance scenario comprises at least one of a site deployment scenario, a network deployment scenario, a network optimization scenario, a network maintenance scenario, a network planning scenario, or a service operation scenario.

11. The apparatus according to claim 10, wherein when the operation and maintenance scenario comprises the site deployment scenario, the operation and maintenance parameter comprises at least one of the following parameters:
a site planning parameter, a full configuration data generation parameter, a site provisioning parameter, or a site acceptance parameter.

12. The apparatus according to claim 4, wherein the processor is further configured to invoke the instructions to:
determine a plurality of operation and maintenance scenarios supported by the network system; and
determine the automation level of the network system based on automation levels of the network system in the plurality of supported operation and maintenance scenarios.

13. A non-transitory computer-readable storage medium, comprising program instructions, wherein when the program instructions are run on a computer, the computer is enabled to perform a network system level division method, the non-transitory computer-readable storage medium comprising:
instructions for obtaining an operation and maintenance parameter of a network system in a first operation and maintenance scenario, wherein the operation and maintenance parameter is used to represent operation and maintenance performance of the network system in the first operation and maintenance scenario;
instructions for determining a first automation level of the network system in the first operation and maintenance scenario based on the operation and maintenance parameter of the network system in the first operation and maintenance scenario, wherein the first automation level of the network system in the first operation and maintenance scenario is used to represent an automatic operation and maintenance degree of the network system in the first operation and maintenance scenario;

instructions for calculating, based on a weight corresponding to each of a plurality of operation and maintenance scenarios supported by the network system, a weighted average value of automation levels of the network system in the plurality of operation and maintenance scenarios supported by the network system, wherein the plurality of operation and maintenance scenarios comprises the first operation and maintenance scenario; and instructions for obtaining an automation level of the network by performing one of:
    rounding up on the weighted average value when automation degrees respectively represented by automation levels increase in an ascending order of the automation levels; or
    rounding down on the weighted average value when automation degrees respectively represented by automation levels decrease in a descending order of the automation levels.

14. The apparatus of claim 4, wherein, when the operation and maintenance scenario comprises the site deployment scenario, the operation and maintenance parameter comprises at least one of the following parameters:

a site planning parameter, a full configuration data generation parameter, a site provisioning parameter, or a site acceptance parameter.

15. The non-transitory computer-readable storage medium of claim 13, wherein, when the operation and maintenance scenario comprises the site deployment scenario, the operation and maintenance parameter comprises at least one of the following parameters:

a site planning parameter, a full configuration data generation parameter, a site provisioning parameter, or a site acceptance parameter.

\* \* \* \* \*